US006793348B2

(12) United States Patent
Lee et al.

(10) Patent No.: US 6,793,348 B2
(45) Date of Patent: Sep. 21, 2004

(54) ADJUSTABLE SUPPORT FRAME FOR IMAGE OUTPUT APPARATUS

(75) Inventors: Hung-Cheng Lee, Junghe (TW); Yu-Yuan Chen, Banchiau (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/705,308

(22) Filed: Nov. 10, 2003

(65) Prior Publication Data

US 2004/0108424 A1 Jun. 10, 2004

(30) Foreign Application Priority Data

Nov. 18, 2002 (TW) ........................................ 91133638 A (51) Int. Cl.⁷ .............................................. G03B 21/14
(52) U.S. Cl. ...................... 353/119; 353/70; 248/188.2; 248/372.1
(58) Field of Search ........................... 248/188.2, 188.3, 248/188.5, 371, 372.1, 395, 292.12; 353/70, 119

(56) References Cited

U.S. PATENT DOCUMENTS

| 4,627,591 | A | * | 12/1986 | Heckmann | 248/411 |
| 5,490,648 | A | * | 2/1996 | Cullen | 248/188.3 |
| 6,302,543 | B1 | * | 10/2001 | Arai et al. | 353/70 |
| 6,715,890 | B2 | * | 4/2004 | Huang et al. | 353/119 |
| 2002/0139909 | A1 | * | 10/2002 | Oyama et al. | |
| 2003/0106972 | A1 | * | 6/2003 | Hsu et al. | |
| 2003/0227601 | A1 | * | 12/2003 | Chang | |

* cited by examiner

*Primary Examiner*—Anita King
*Assistant Examiner*—Jon Szumny
(74) *Attorney, Agent, or Firm*—Snell & Wilmer L.L.P.

(57) ABSTRACT

The present invention relates to a support frame for adjusting the height of an image output apparatus. The frame includes a rotatable damping wheel and a supporting foot. When the damping wheel pushes against a side of the supporting foot to form a positioning state, the foot is static to the housing. If the housing is pressed downward, the damping wheel rotates to make the supporting foot move relative to the housing for adjusting height of the image output apparatus.

18 Claims, 11 Drawing Sheets

ADJUSTABLE SUPPORT FRAME FOR IMAGE OUTPUT APPARATUS

CROSS REFERENCE TO RELATED APPLICATIONS

This application claims priority of Taiwan Patent Application Serial No. 091133638 filed on Nov. 18, 2002.

FIELD OF INVENTION

The present invention relates to an adjustable support frame for adjusting the height of the image output apparatus.

BACKGROUND OF THE INVENTION

Image output apparatuses are necessary in an age emphasizing video/audio effects. For the image output apparatuses, such as projectors or epidiascopes, to adapt to different usage environment, the height adjustability of the display image is required.

Typically, conventional image output apparatuses have devices for adjusting the height. Most common adjusting devices include a plastic-wrapped screw, and the height is adjusted by rotating the screw. But such designs have a few defects as follows. The first one is that if all components are embodied as a single module, the corresponding size becomes larger thus occupying more room within the image output apparatus, or making the profile size larger. The second one is that the user may have to adjust the height with both hands. The third one is that the screw may not act smoothly as desired.

SUMMARY OF THE INVENTION

The present invention is intended to adjust height of the image output apparatus steplessly with a relatively simple and small-size structure, thus facilitating the easy installment and saving more room. And the user may operate the apparatus smoothly using one hand pressing the image output apparatus.

One aspect of the present invention provides a support frame of an image output apparatus for adjusting height of the image output apparatus.

Another aspect of the present invention provides a support frame of an image output apparatus, occupying less room and acting smoothly. And the user may adjust height of the image output apparatus with single hand.

The present invention provides a support frame including a first positioning unit coupled to the housing of an image output apparatus, and a supporting foot. The first positioning unit is a damping wheel. The damping wheel is allowed to rotate in only one direction. When the damping wheel pushes against a side of the supporting foot and forms a positioning state, the supporting foot is static to the housing. When the housing is pressed downward, the wheel rotates to make the supporting foot move relative to the housing for adjusting height of the image output apparatus. The damping wheel may be a roller, a gear, or the like. The side of the supporting foot is a surface able to form a positioning state with the damping wheel, such as a positioning surface, a rack, or the like. The present invention further includes a coupling unit, and the damping wheel is coupled to the coupling unit.

The adjustable support frame according to the present invention further includes an apparatus by which the coupling unit horizontally moves relative to the housing. The apparatus may be a spring, a sliding railway apparatus, a gear apparatus, or similar apparatus. In a preferred embodiment, the apparatus refers to a spring, which provides the coupling unit with resilience as the coupling unit horizontally moves relative to the housing.

The adjustable support frame according to the present invention further includes an apparatus by which the supporting foot vertically moves relative to the housing. The apparatus may be a spring, a sliding railway apparatus, a gear apparatus, or similar apparatus. In a preferred embodiment, the apparatus refers to a spring, which provides the supporting foot with resilience as the supporting foot vertically moves relative to the housing.

The adjustable support frame according to the present invention further includes a separating apparatus. When the housing is pressed downward, the separating apparatus is triggered to drive the damping wheel to separate from the supporting foot. The separating apparatus may be an apparatus, for example a wedge-shaped device with an appropriate angle, for translating any pressed force into a horizontal one.

BRIEF DESCRIPTION OF THE DRAWINGS

To explain the principle of the present invention, schematic diagrams of embodiments are attached and briefly described as follows. Similar notation numbers across different drawings represent similar elements.

DETAILED DESCRIPTION

The present invention provides an adjustable support frame for adjusting a height of the image output apparatus. The image output apparatus described herein may be a projector, a bioscope, an epidiascope or similar apparatus.

Figure 1A:
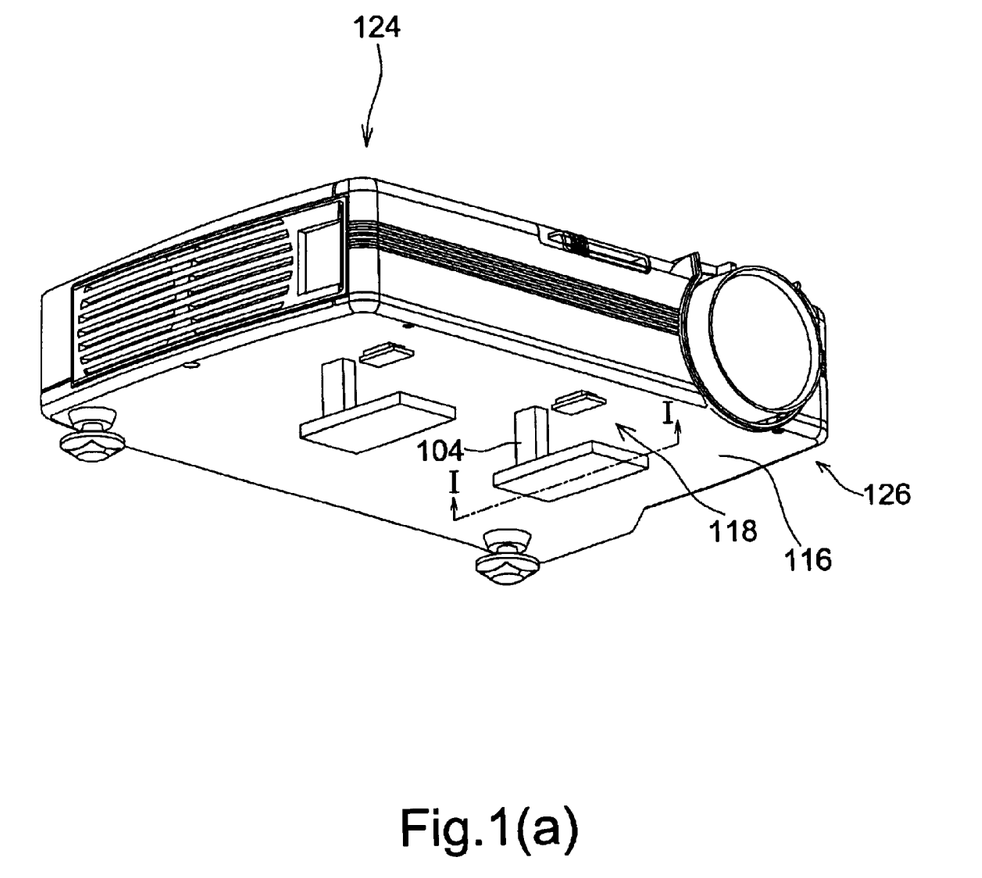
FIG. 1(a) depicts an appearance of assembly of an embodiment in accordance with the present invention with an image output apparatus.

FIG. 1(a) depicts an appearance of assembly of an embodiment with an image output apparatus 124 in accordance with the present invention. The support frame in accordance with the present invention is disposed at the front end 126 of the image output apparatus 124. The support frame includes a supporting foot 104 and a separating apparatus 118. Adjusting the length of the supporting foot 104 extending out of the housing 116 may change the height of the image output apparatus 124.

Figure 1B:
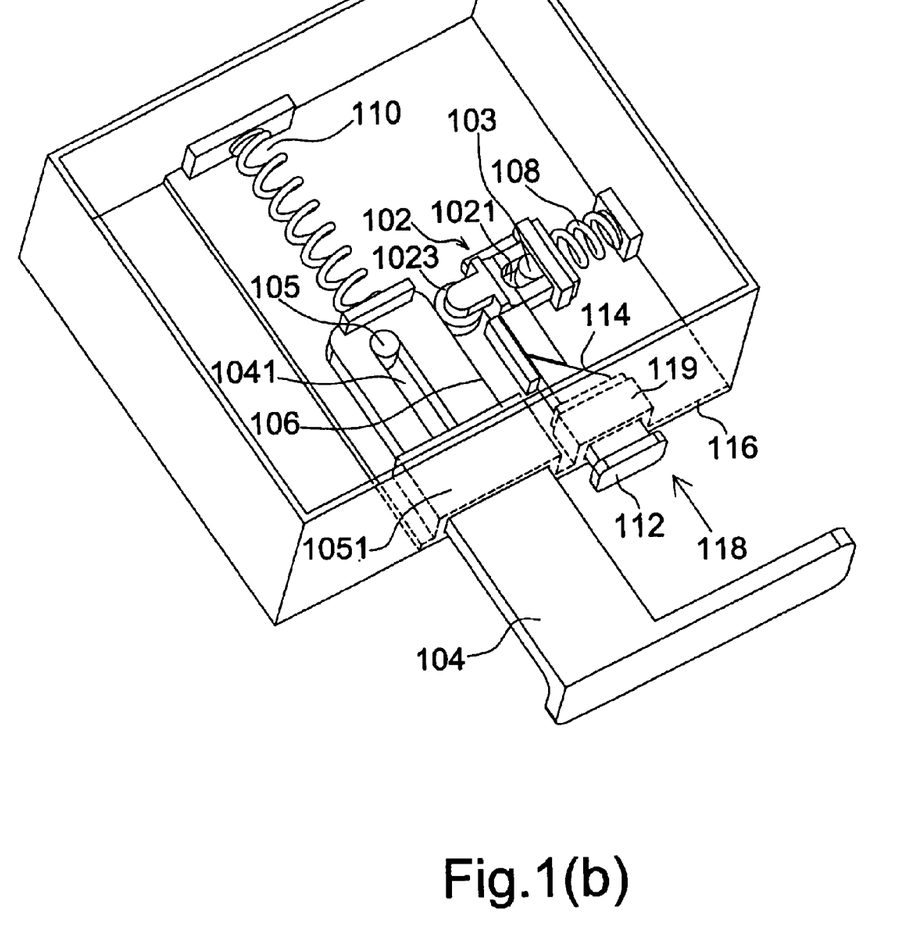
FIG. 1(b) depicts a cross-sectional view dissected along line I—I of FIG. 1(a).

FIG. 1(b) depicts a cross-sectional view dissected along line I—I of FIG. 1(a). The present invention includes a damping wheel 1023 coupled to the housing 116, a supporting foot 104 and a side 106 of the supporting foot 104. The housing 116 may be a housing corresponding to a projector, a bioscope, or an epidiascope. The supporting foot 104 stands on the surface of an object (e.g. a desk). The damping wheel 1023 is allowed to rotate in only one direction. Here the damping wheel 1023 is allowed to rotate clockwise, and is forbidden to rotate clockwise. When the damping wheel 1023 pushes against a side 106 of the supporting foot 104 to form a positioning state, the supporting foot 104 is static to the housing 116. When the housing 116 is pressed downward, the supporting foot 104 moves relative to the housing 116 for adjusting the height of the image output apparatus. According to this embodiment, the damping wheel 1023 may be a roller 1023, and the side 106 of the supporting foot 104 may be a positioning surface 106. The present invention further includes a coupling unit 102. The damping wheel 1023 is rotatably coupled to the coupling unit 102.

In this embodiment, the coupling unit 102 is coupled to and horizontally movable to the housing 116 by a first groove 1021, a first sliding railway 103 and a first spring 108, as shown in FIG. 1(b). The coupling unit 102 includes the first groove 1021, and the housing 116 includes the first sliding railway 103. The first groove 1021 meshes with the sliding railway 103 so that the coupling unit 102 is under control rather than comes off when sliding. The coupling unit 102 may include the first sliding railway 103, and the housing 116 may include the first groove 1021 without departing from the spirit of the present invention. Additionally, when the coupling unit 102 horizontally moves relative to the housing 116, the first spring 108 provides the coupling unit 102 with resilience.

In this embodiment, the supporting foot 104 is coupled to and vertically movable to the housing 116 by a second groove 1041, a second sliding railway 105, a sliding railway frame 1051 of the supporting foot 104 and a second spring 110, as shown in FIG. 1(b). The supporting foot 104 includes the second groove 1041, and the housing 116 includes the second sliding railway 105 meshing with the second groove 1041. The sliding railway frame 1051 corresponding to the supporting foot 104 is so provided that the supporting foot 104 is under control rather than comes off or shakes when sliding. The supporting foot 104 may include the second sliding railway 105, and the housing 116 may include the second groove 1041 and the sliding railway frame 1051 without departing from the spirit of the present invention. Additionally, when the supporting foot 104 vertically moves relative to the housing 116, the second spring 110 provides the supporting foot 104 with resilience.

Figure 1C:
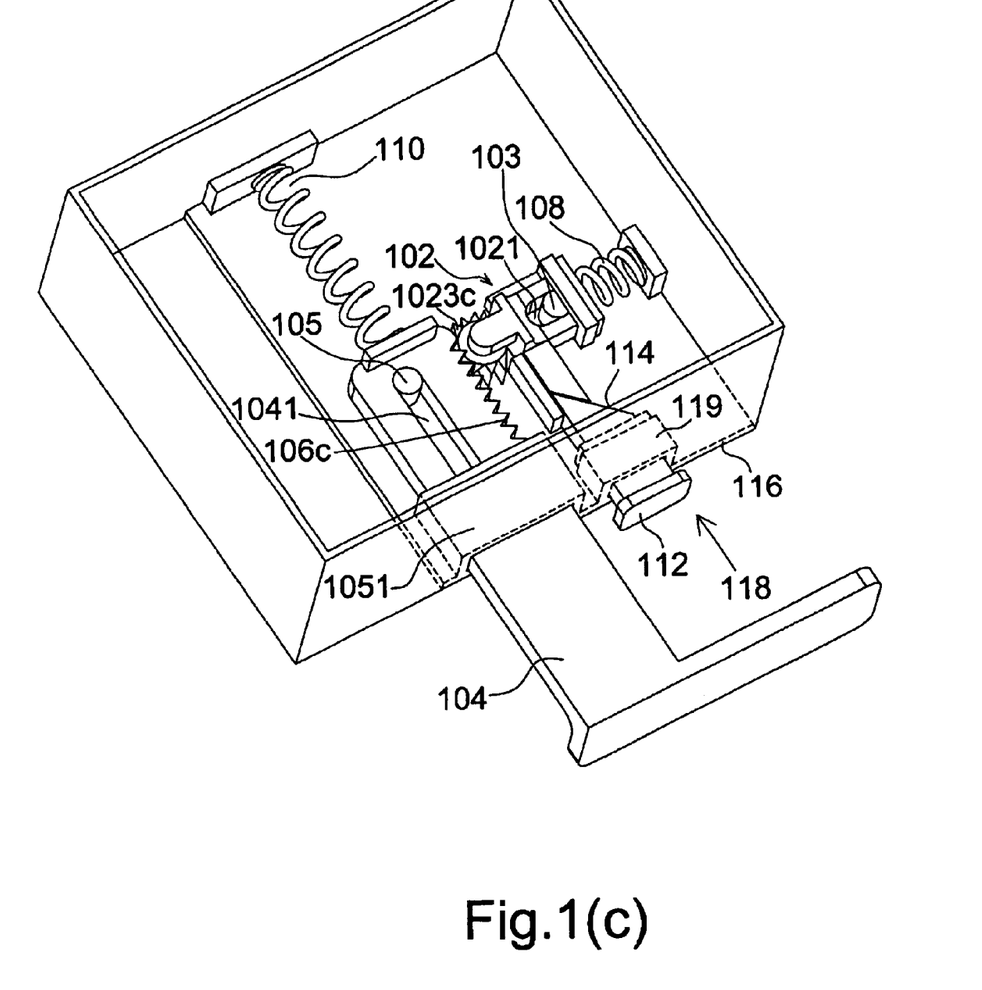
FIG. 1(c) depicts another embodiment of a damping wheel and a side of a supporting foot in accordance with the present invention.

FIG. 1(c) depicts another embodiment of the positioning unit in accordance with the present invention. The damping wheel 1023c is a gear 1023c, and the side 106c of the supporting foot 104 is a rack 106c meshing with the gear 1023c. Similarly, the gear 1023c is allowed to rotate in only one direction. Here the gear 1023c is allowed to rotate counterclockwise, and is forbidden to rotate clockwise.

Figure 5:
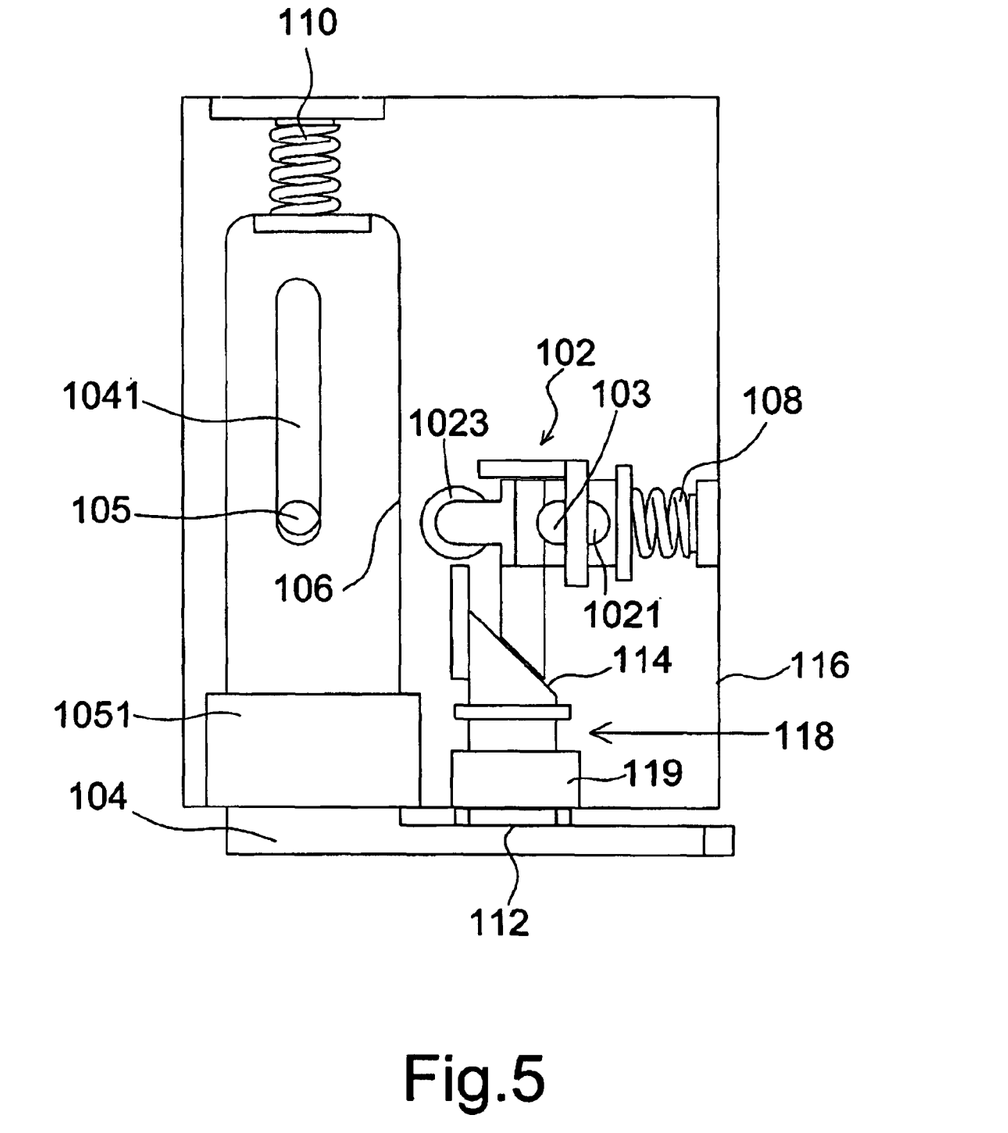
FIG. 5 depicts a damping wheel separating from a side of a supporting foot in accordance with an embodiment of the present invention.

Still referring to FIG. 1(b), the present invention further includes a separating apparatus 118. In this embodiment, the separating apparatus 118 is movably disposed in the housing 116 by a sliding railway frame 119 corresponding to the separating apparatus 118, as shown in FIG. 1(b). The first surface 112 of the separating apparatus 118 is located outside the housing 116, and the second surface 114 is located inside the housing 116. When a force is applied to the first surface 112, the second surface 114 is made to upwards press the coupling unit 102 so that the damping wheel 1023 separates from the side 106 of the supporting foot 104, as shown in FIG. 5. In this embodiment, the separating apparatus 118 is wedge-shaped and moves vertically relative to the housing 116. The separating apparatus 118 may turn the vertical force applied to the first surface 112 into a horizontal one. When the second surface 114 is made to upwardly press the coupling unit 102, the coupling unit 102 moves horizontally rightwards relative to the housing 116, and the damping wheel 1023 separates from a side 106 of the supporting foot 104.

Figure 2:
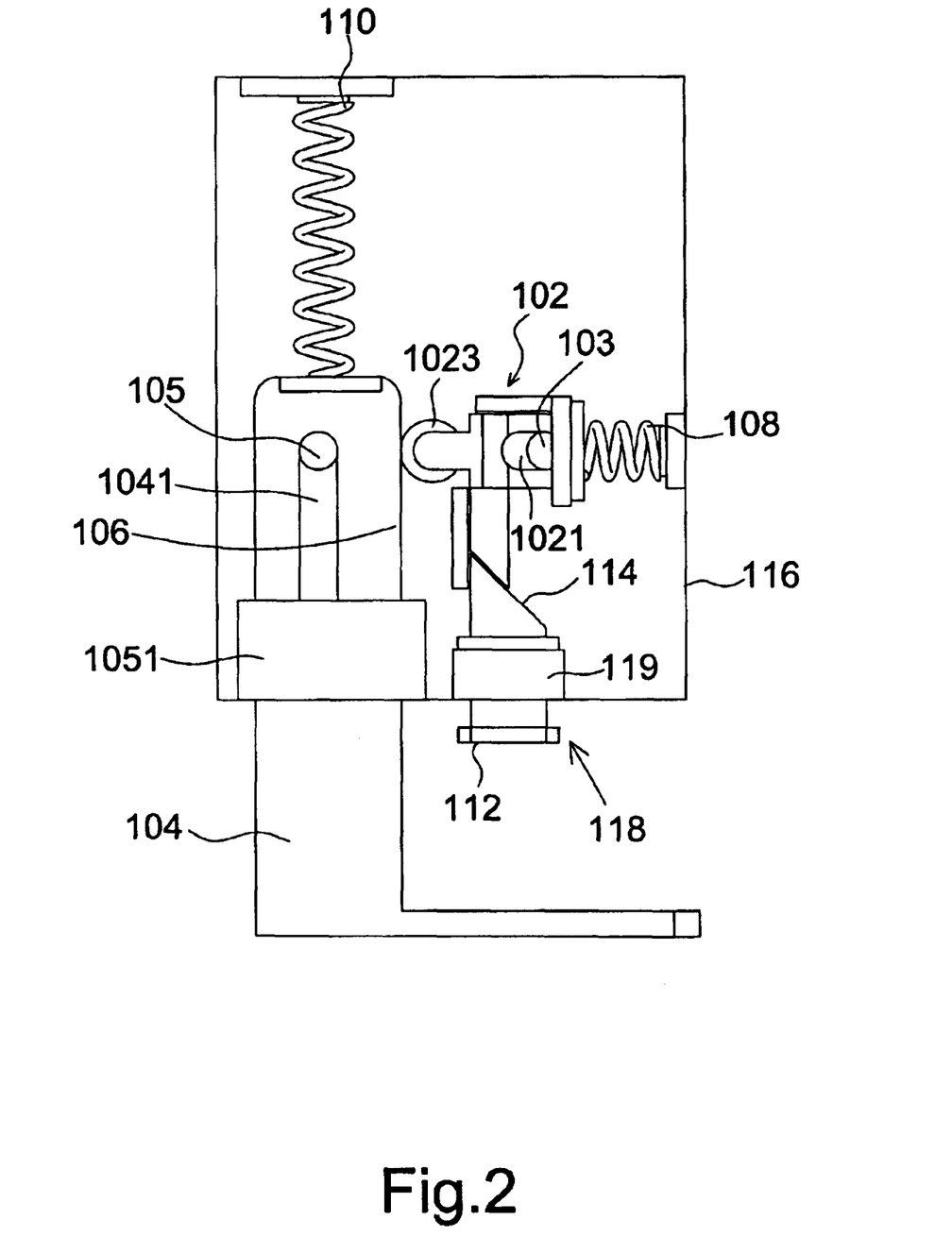
FIG. 2 depicts a supporting foot having a maximum length exposed in accordance with an embodiment of the present invention.

FIG. 2 depicts a supporting foot 104 in accordance with an embodiment of the present invention having a maximum length exposed. When no force is applied to the housing 116, both the first spring 108 and the second spring 110 remain in an original state, and the damping wheel 1023 touches a side 106 of the supporting foot 104 at the top to form the positioning state. Then the housing 116 is located at the top, namely the supporting foot 104 has a maximum length exposed outside of the housing 116.

Figure 3:
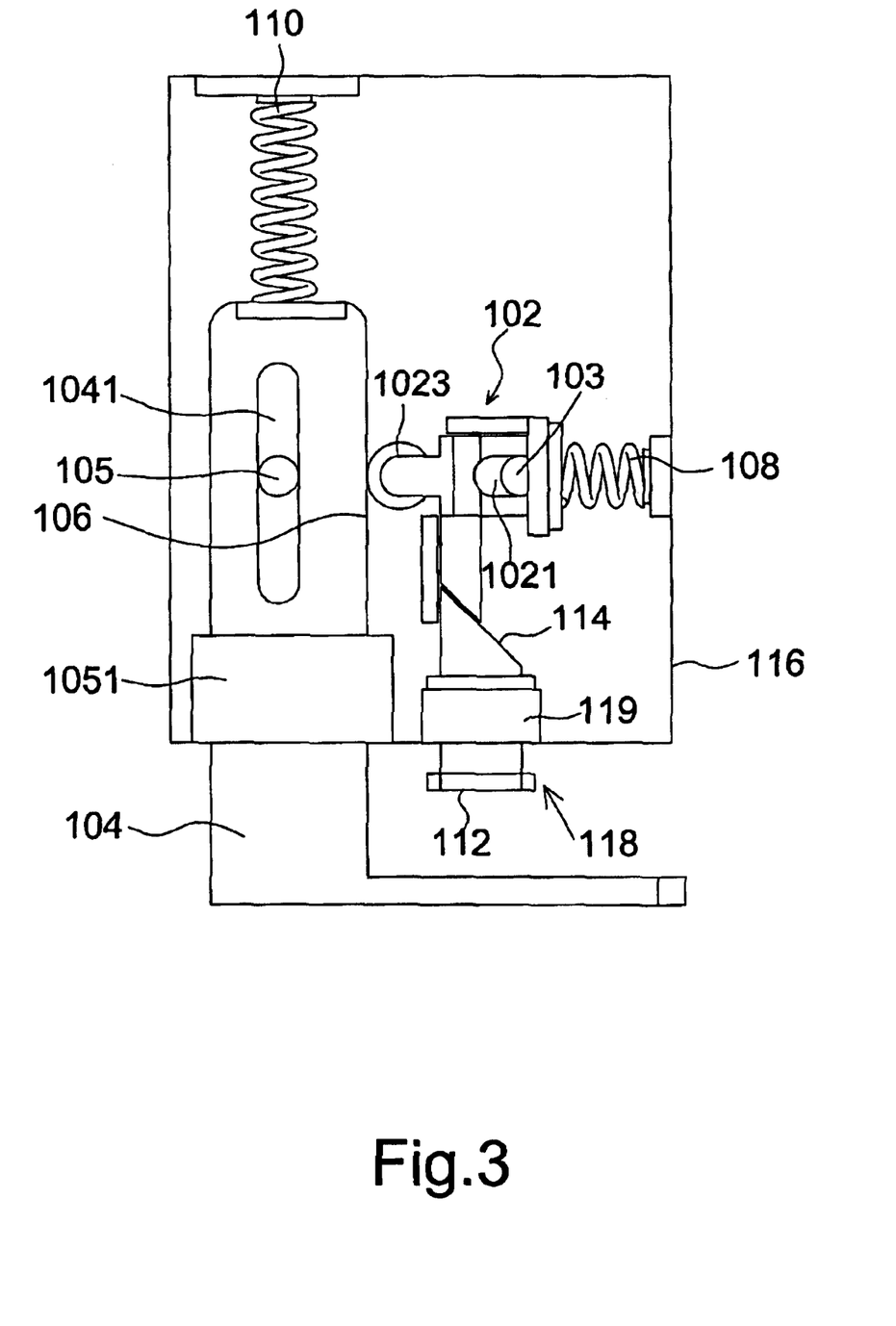
FIG. 3 depicts the supporting foot having a certain length exposed in accordance with an embodiment of the present invention.

FIG. 3 depicts the supporting foot 104 shortened to a certain length in accordance with an embodiment of the present invention having a certain length exposed. When a force is applied downwards to and vertically relative to the housing 116, the second spring 110 becomes in a compressed state and the first spring 108 remains in the original state. Then the damping effect of the damping wheel 1023 cooperates with the side 106 of the supporting foot 104 to resist the resilience of the second spring 110, forming the positioning state again at a certain height. Therefore the housing 116 moves downwards relative to the supporting foot 104, namely the supporting foot 104 has less exposed length outside the housing 116.

Figure 4:
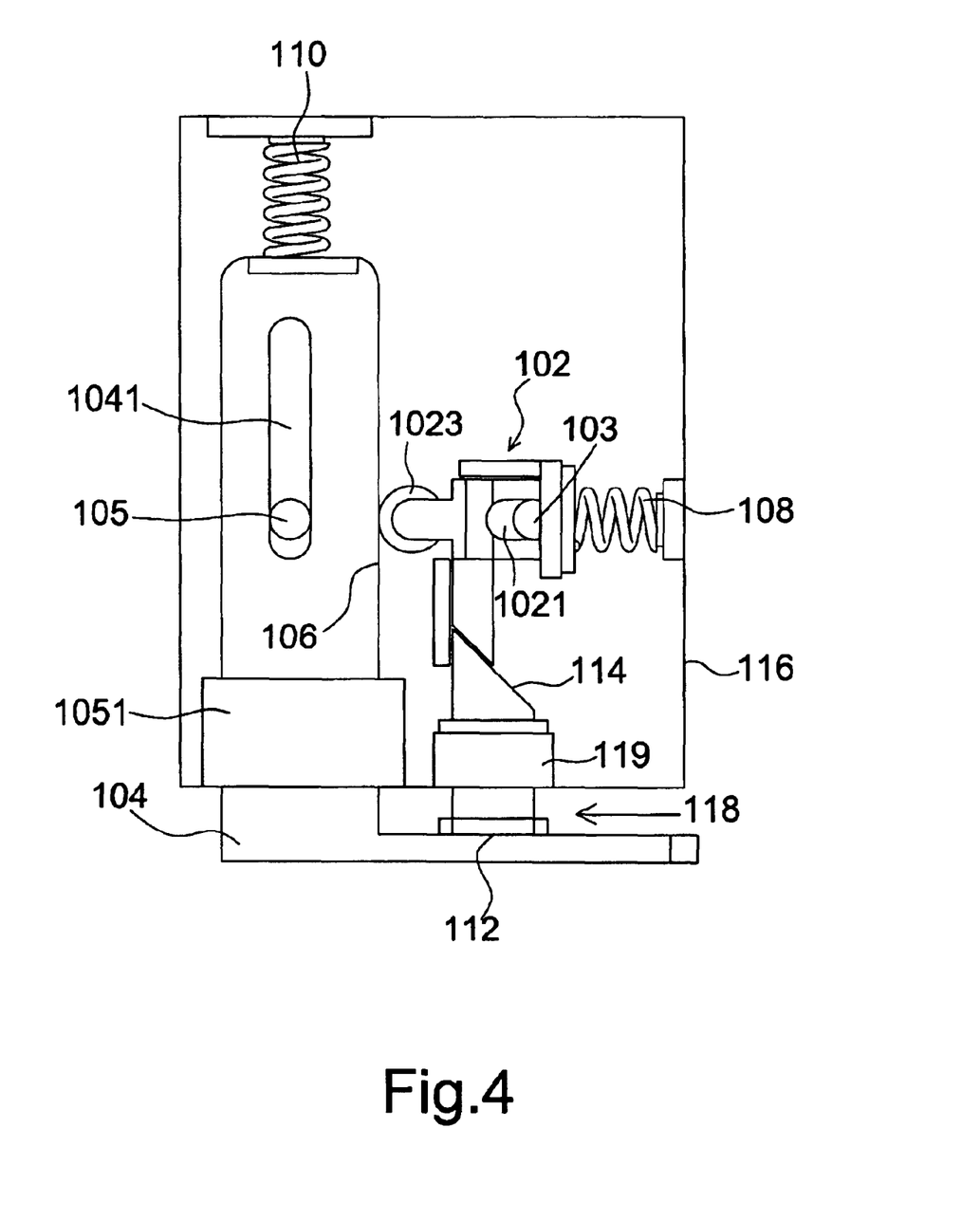
FIG. 4 depicts the supporting foot having a minimum length exposed in accordance with an embodiment of the present invention.

FIG. 4 depicts the supporting foot 104 shortened to the shortest in accordance with an embodiment of the present invention having a minimum length exposed. When a larger force is applied vertically to the housing 116, the second spring 110 is compressed much more, while the first spring 108 still remains in the original state. The damping effect of the damping wheel 1023 cooperates with the side 106 of the supporting foot 104 to resist the resilience of the second spring 110, forming the positioning state at the bottom. Therefore the housing 116 moves downwards most relative to the supporting foot 104, namely the supporting foot 104 has a shortened length exposed outside the housing 116.

FIG. 5 depicts a damping wheel 1023 separating from the side 106 of a supporting foot 104 and returning from the state shown in FIG. 4 to the state shown in FIG. 2, in accordance with an embodiment of the present invention. As the housing 116 has moved to the bottom relative to the supporting foot 104 (as shown in FIG. 4), the first surface 112 of the separating apparatus 118 would touch the supporting foot 104 if a force is further applied vertically downwards to the housing 116. Therefore the first surface 112 suffers a vertical upward force and the second surface 114 touches the coupling unit 102. According to the separating apparatus 118 of the embodiment, the vertical upward force applied to the first surface 112 is diverted to a horizontal one by the wedge-shaped structure of the separating apparatus 118. Then the coupling unit 102 is pushed rightwards by the second surface 114 and the first spring 108 becomes compressed. Thus the damping wheel 1023 separates from a side 106 of the supporting foot 104 and the second spring 110 remains compressed this moment.

Once the damping wheel 1023 separates from the side 106 of the supporting foot 104, as shown in FIG. 5, the supporting foot 104 may not be able to resist the resilience provided by the second spring 110. Thus the second spring 110 tends to return to the original state and the housing 116 is forced to reach the top again. The first surface 112 of the separating apparatus thus no longer suffers a vertically upward force. And the first spring 108 no longer suffers a horizontal force and tends to return to the original state. Therefore the coupling unit 102 is pushed back. Then the damping wheel 1023 pushes against the side 106 of the supporting foot 104 at the top again to form the positioning state, and the supporting foot 104 is returned to the state shown in FIG. 2.

The separating process described above is achieved by adjusting the friction between the second surface 114 and the coupling unit 102 and elasticity coefficient corresponding to the first spring 108 and the second spring 110. The friction and the elasticity coefficient are adjusted to ensure that the housing 116 is forced to reach the top again before the first spring 108 returning to the original state.

Figure 6:
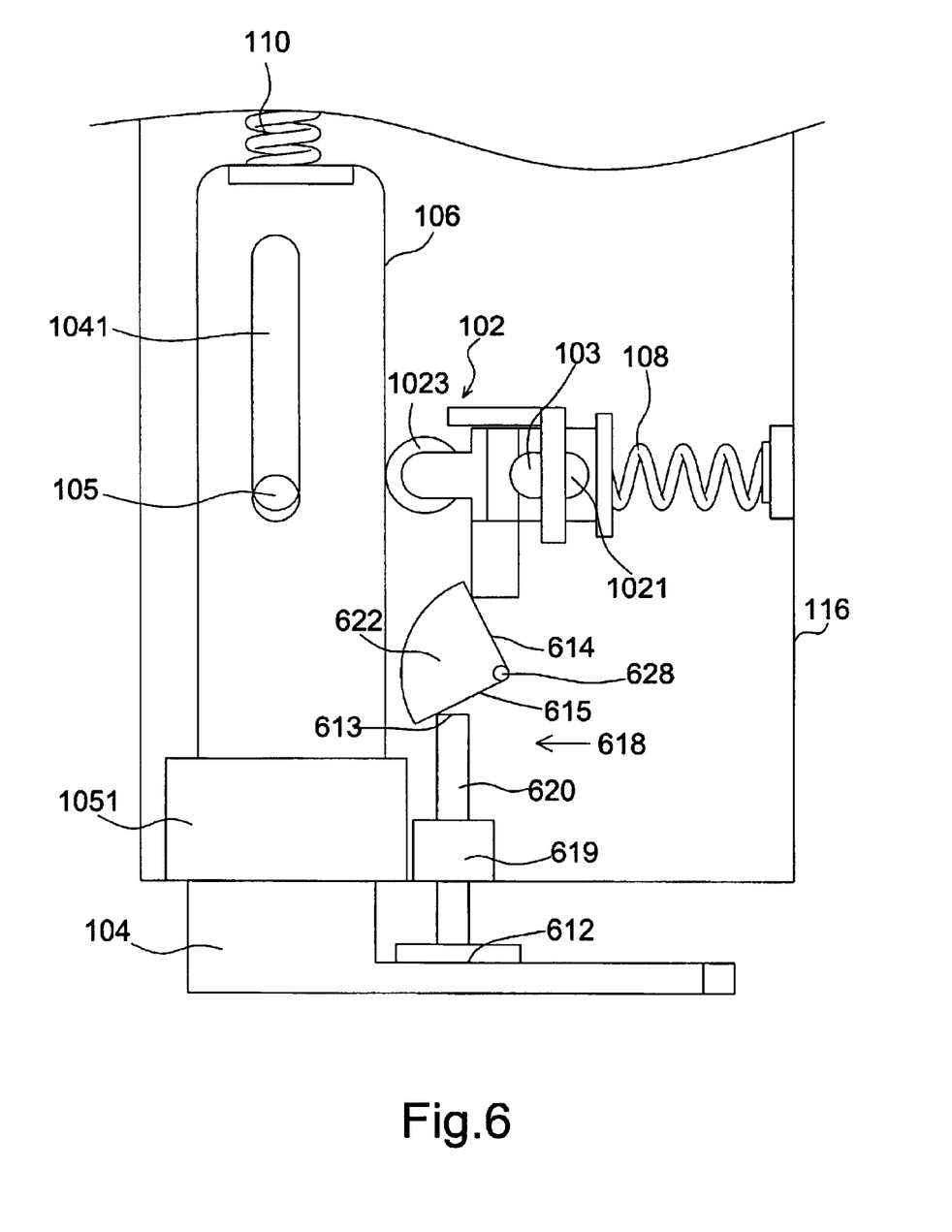
FIG. 6 depicts a separating apparatus in accordance with another embodiment of the present invention.
Figure 7:
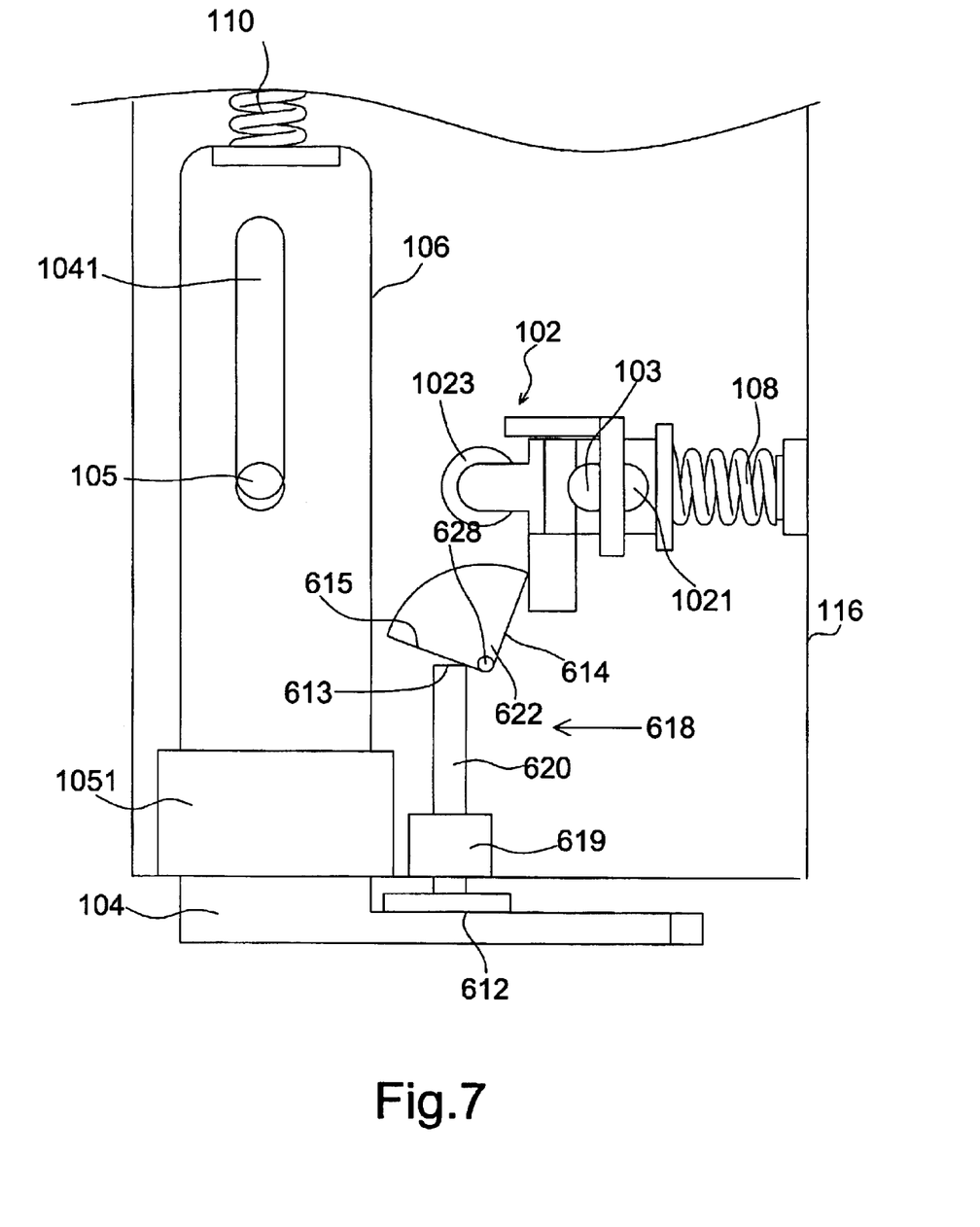
FIG. 7 depicts the separating apparatus driving the damping wheel to separate from a side of the supporting foot in accordance with another embodiment of the present invention.

FIG. 6 and FIG. 7 depict a separating apparatus 618 and the corresponding operation in accordance with another embodiment of the present invention. The separating apparatus 618 includes a first separating unit 620, a second separating unit 622, a first surface 612, a second surface 614, a third surface 613 and a fourth surface 615. The first separating unit 620 is movably disposed in the housing 116 by a sliding railway frame 619 of the separating apparatus 618, as shown in FIG. 6. The second separating unit 622 is rotatably disposed in the housing 116 by an axle 628.

When the housing 116 has moved to the bottom relative to the supporting foot 104, the first surface 612 would touch the supporting foot 104 if a force is further applied vertically downwards to the housing 116. Therefore the first surface 612 suffers a vertical upward force and the third surface 613 touches the fourth surface 615. The second separating unit 622 is forced to rotate clockwise and the second surface 614 pushes the coupling unit 102 rightwards. Then the damping wheel 1023 separates from a side 106 of the supporting foot 104. The second spring 110 still remains compressed this moment.

Once the damping wheel 1023 separates from the side 106 of the supporting foot 104, as shown in FIG. 7, the supporting foot 104 may not be able to resist the resilience provided by the second spring 110. The second spring 110 thus tends to return to the original state and obliges the housing 116 to reach the top again. The first surface 612 of the separating apparatus 618 no longer suffers a vertically upward force. And the first spring 108 no longer suffers a horizontal force and tends to return to the original state. Then the coupling unit 102 is pushed back. The damping wheel 1023 pushes against the side 106 of the supporting foot 104 at the top forming the positioning state again so that the supporting foot 104 returns to the state shown in FIG. 2.

The separating process described above is achieved by a torsion spring disposed in the axle 628 for cooperating with the first spring 108, as well as by adjusting the elasticity coefficient corresponding to the first spring 108 and the second spring 110. The torsion spring and the adjusted elasticity coefficients may ensure that the housing 116 is obliged to reach the top again before the first spring 108 returns to the original state.

Figure 8:
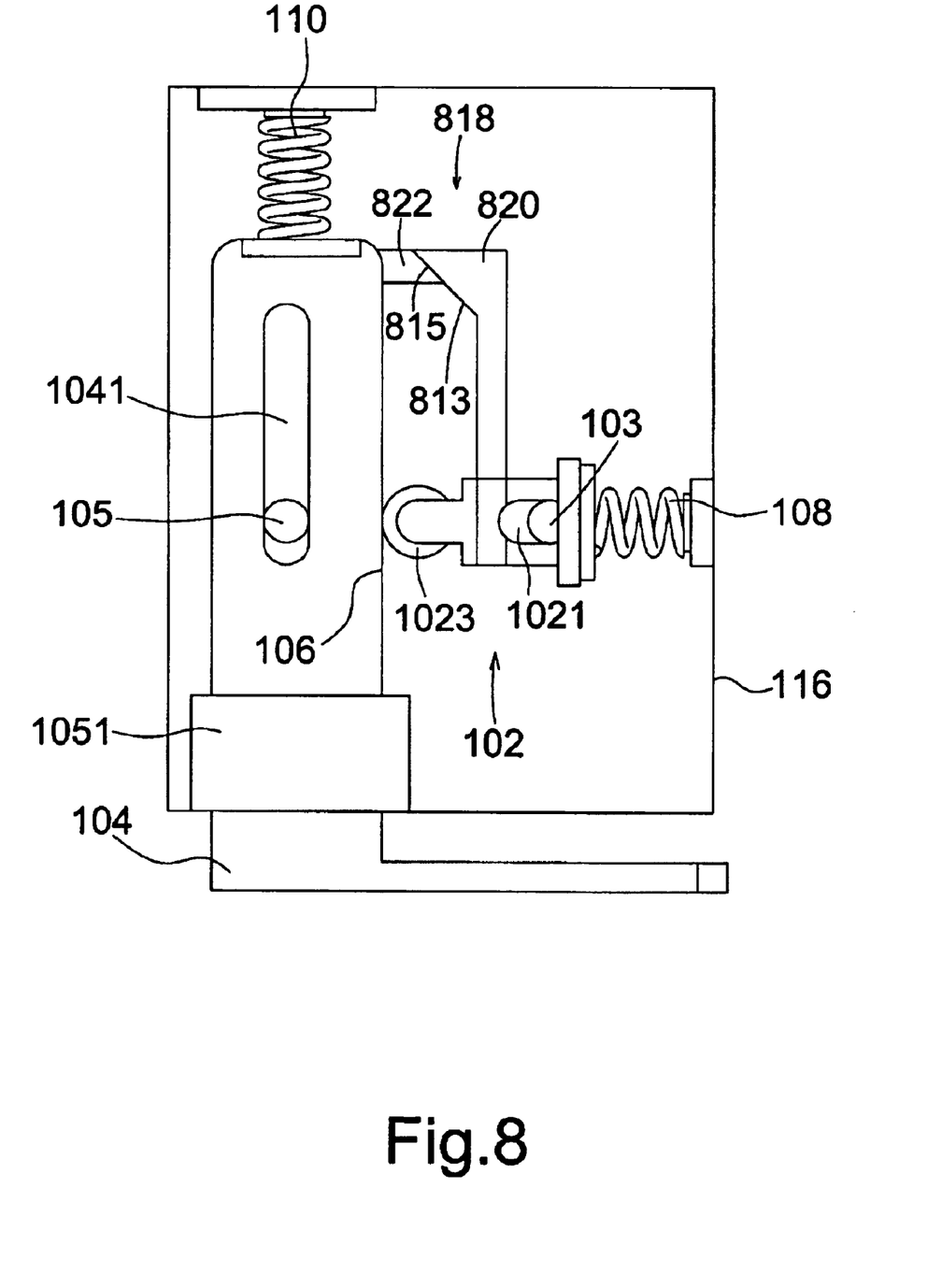
FIG. 8 depicts a separating apparatus in accordance with a further embodiment of the present invention.
Figure 9:
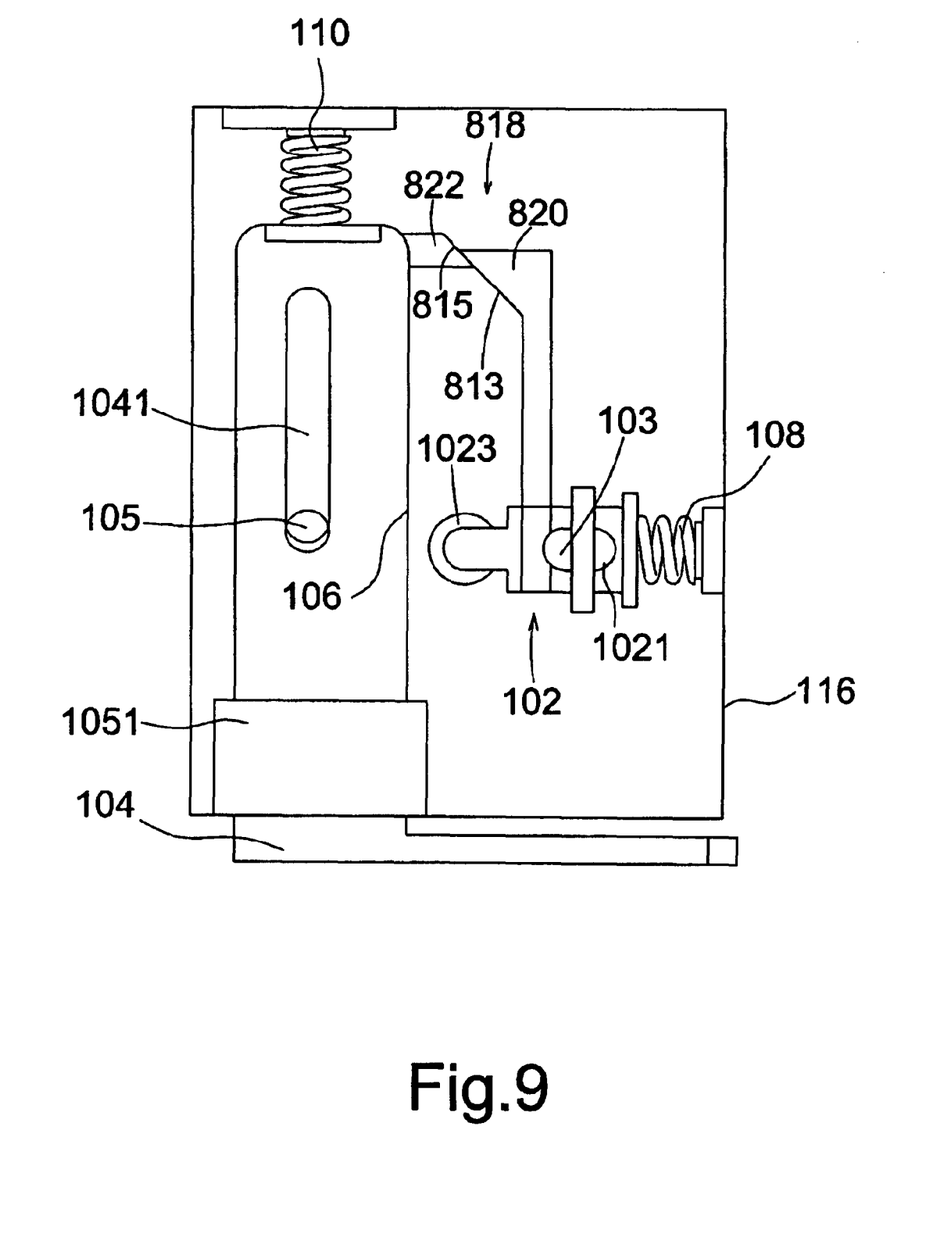
FIG. 9 depicts the separating apparatus driving the damping wheel to separate from a side of the supporting foot in accordance with a further embodiment of the present invention.

FIG. 8 and FIG. 9 depict a separating apparatus 818 and the corresponding operation in accordance with a further embodiment of the present invention. No surface of the separating apparatus 818 is located outside the housing 116. The separating apparatus 818 includes a first separating unit 820 coupled to the coupling unit 102 and a second separating unit 822 coupled to the supporting foot 104. The first separating unit 820 has a third surface 813. The second separating unit 822 has a fourth surface 815. When the housing 116 is pressed downward to make the third surface 813 touch the fourth surface 815, the coupling unit 102 is pushed rightwards and the damping wheel 1023 separates from a side 106 of the supporting foot 104. The separating process, referring to other embodiments of the separating apparatus mentioned above, is achieved by adjusting the friction between the first groove 1021 and the first slide railway 103 and elasticity coefficient corresponding to the first spring 108 and the second spring 110. The friction and the elasticity coefficient are adjusted to ensure that the housing 116 is obliged to reach the top again before the first spring 108 returns to the original state.

While this invention has been described with reference to the illustrative embodiments, these descriptions are not is intended to be construed in a limiting sense. Those skilled in the art may be able to make modification or alternation of these embodiments, which do not depart from the spirit and scope of the present invention. For instance, different positioning units, coupling units or separating apparatuses may be provided. Various modifications of the illustrative embodiments, as well as other embodiments of the invention, will be apparent upon reference to these descriptions. It is therefore contemplated that the appended claims will cover any such modifications or embodiments as falling within the true scope of the invention and its legal equivalents.

We claim:

1. A support frame of an image output apparatus for adjusting height of said image output apparatus, said image output apparatus having a housing, said support frame comprising:
   a rotatable damping wheel disposed in said housing; and
   a supporting foot movably coupled to said housing;
   wherein said supporting foot is static to said housing as said damping wheel pushes against a side of said supporting foot forming a positioning state, and said damping wheel rotates to make said supporting foot move relative to said housing for adjusting height of said image output apparatus as said housing is pressed downward, wherein said damping wheel is allowed to rotate in only one direction.

2. The support frame of claim 1, said support frame further comprising a coupling unit, wherein said damping wheel is coupled to said coupling unit.

3. The support frame of claim 2, wherein said coupling unit is coupled to and horizontally movable to said housing.

4. The support frame of claim 3, wherein said coupling unit is coupled to said housing by a first spring, said first spring provides said coupling unit with resilience as said coupling unit horizontally moves relative to said housing.

5. The support frame of claim 1, wherein said supporting foot is coupled to and vertically movable to said housing.

6. The support frame of claim 5, wherein said supporting foot is coupled to said housing by a second spring, said second spring provides said supporting foot with resilience as said supporting foot vertically moves relative to said housing.

7. The support frame of claim 1, wherein said damping wheel includes a roller, said side of said supporting foot is a positioning surface corresponding to said roller.

8. The support frame of claim 1, wherein said damping wheel includes a gear, said side of said supporting foot is a rack meshing with said gear.

9. A support frame of an image output apparatus for adjusting height of said image output apparatus, said image output apparatus having a housing, said support frame comprising:

a supporting foot movably coupled to said housing;

a first positioning unit configured to movably push against a side of said supporting foot; and a separating apparatus for driving said first positioning unit to separate from said supporting foot as said housing is pressed downward;

wherein said supporting foot is static to said housing as said first positioning unit pushes against a side of said supporting foot forming a positioning state, and as said housing is pressed downward, said separating apparatus is triggered to drive said first positioning unit.

10. The support frame of claim 9, said support frame further comprising a coupling unit, wherein said first positioning unit is coupled to said coupling unit.

11. The support frame of claim 10, wherein said coupling unit is coupled to and horizontally movable to said housing.

12. The support frame of claim 11, wherein said coupling unit is coupled to said housing by a first spring, said first spring provides said coupling unit with resilience as said coupling unit horizontally moves relative to said housing.

13. The support frame of claim 10, wherein said supporting foot is coupled to and vertically movable to said housing.

14. The support frame of claim 13, wherein said supporting foot is coupled to said housing by a second spring, said second spring provides said supporting foot with resilience as said supporting foot vertically moves relative to said housing.

15. The support frame of claim 10, said separating apparatus further comprising:

a first surface located outside of said housing; and a second surface located inside of said housing;

wherein said second surface touches and drives said coupling unit to move relative to said housing as a force is applied on said first surface, such that said first positioning unit separates from said supporting foot.

16. The support frame of claim 10, said separating apparatus further comprising:

a first separating unit disposed on said coupling unit; and a second separating unit disposed on said supporting foot;

wherein said second separating unit touches and drives said first separating unit to move relative to said housing as said housing is pressed downward, such that said coupling unit moves relative to said housing, and said first positioning unit separates from said supporting foot.

17. The support frame of claim 9, wherein said first positioning unit includes a roller, said side of said supporting foot is a positioning surface corresponding to said roller, and said roller is allowed to rotate in only one direction.

18. The support frame of claim 9, wherein said first positioning unit includes a gear, said side of said supporting foot is a rack meshing with said gear, and said gear is allowed to rotate in only one direction.

* * * * *